US009475709B2

(12) United States Patent
Stetson et al.

(10) Patent No.: US 9,475,709 B2
(45) Date of Patent: *Oct. 25, 2016

(54) PERFORATED GRAPHENE DEIONIZATION OR DESALINATION

(71) Applicant: LOCKHEED MARTIN CORPORATION, Bethesda, MD (US)

(72) Inventors: John B. Stetson, New Hope, PA (US); Jonathan Mercurio, Lumberton, NJ (US); Alan Rosenwinkel, Haddonfield, NJ (US); Peter V. Bedworth, Los Gatos, CA (US); Shawn P. Fleming, Lumberton, NJ (US); Aaron L. Westman, Brewerton, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 565 days.

This patent is subject to a terminal disclaimer.

(21) Appl. No.: 13/719,579

(22) Filed: Dec. 19, 2012

(65) Prior Publication Data

US 2013/0105417 A1 May 2, 2013

Related U.S. Application Data

(63) Continuation-in-part of application No. 12/868,150, filed on Aug. 25, 2010, now Pat. No. 8,361,321.

(51) Int. Cl.
*B01D 39/00* (2006.01)
*B01D 63/00* (2006.01)
(Continued)

(52) U.S. Cl.
CPC .............. *C02F 1/442* (2013.01); *B01D 61/02* (2013.01); *B01D 61/027* (2013.01); *B01D 67/006* (2013.01); *B01D 71/021* (2013.01); *B82Y 30/00* (2013.01); *C02F 2103/08* (2013.01)

(58) Field of Classification Search
CPC .... B82Y 30/00; B82Y 40/00; B01D 71/021; B01D 39/20; B01D 39/1692; B01D 2319/022; B01D 61/025; B01D 63/06; C02F 1/44

USPC ................ 210/651–653, 490, 500.25, 321.6, 210/321.75, 195, 257.2, 806; 977/742, 752, 977/902, 781; 204/154–156; 428/99, 166
See application file for complete search history.

(56) References Cited

U.S. PATENT DOCUMENTS

| 5,425,858 A | 6/1995 | Farmer ......................... 204/149 |
| 5,636,437 A | 6/1997 | Kaschmitter et al. .......... 29/825 |

(Continued)

FOREIGN PATENT DOCUMENTS

| EP | 2450096 | 5/2012 |
| JP | 2001232158 | 8/2001 |

(Continued)

OTHER PUBLICATIONS

International Search Report mailed Mar. 12, 2014 in corresponding application No. PCT/US2013/074942.
Written Opinion mailed Mar. 12, 2014 in corresponding application No. PCT/US2013/074942.
Jiang et al.; *Porous Graphene as the Ultimate Membrane for Gas Separation*; Nano Letters; Dec. 9, 2009; American Chemical Society, USA; vol. 9, No. 12; Dec. 9, 2009.

(Continued)

*Primary Examiner* — Ana Fortuna
(74) *Attorney, Agent, or Firm* — Lathrop & Gage LLP

(57) ABSTRACT

A fluid deionizer includes at least one graphene sheet perforated with apertures dimensioned to allow a flow of fluid and to disallow at least one particular type of ion contained in the flow of fluid. A purge valve is placed in an open position so as to collect the at least one particular type of ion disallowed by the graphene sheet so as to clean off the at least one graphene sheet. Another embodiment provides a deionizer with graphene sheets in cylindrical form. A separation apparatus is also provided in a cross-flow arrangement where a pressurized source directs a medium along a path substantially parallel to at least one sheet of graphene from an inlet to an outlet. The medium flows through the plural perforated apertures while a remaining portion of the medium and the disallowed components in the medium flow out the outlet.

30 Claims, 7 Drawing Sheets

(51) Int. Cl.
| | |
|---|---|
| B01D 61/00 | (2006.01) |
| C02F 1/44 | (2006.01) |
| B01D 61/02 | (2006.01) |
| B01D 67/00 | (2006.01) |
| B01D 71/02 | (2006.01) |
| B82Y 30/00 | (2011.01) |
| C02F 103/08 | (2006.01) |

(56) References Cited

U.S. PATENT DOCUMENTS

| | | | |
|---|---|---|---|
| 5,731,360 A | 3/1998 | Pekala et al. | 521/54 |
| 5,902,762 A | 5/1999 | Mercuri et al. | |
| 5,932,185 A | 8/1999 | Pekala et al. | 423/445 R |
| 5,954,937 A | 9/1999 | Farmer | 205/687 |
| 5,980,718 A | 11/1999 | Van Konynenburg et al. | 204/551 |
| 6,309,532 B1 | 10/2001 | Tran et al. | 205/687 |
| 6,346,187 B1 | 2/2002 | Tran et al. | 205/342 |
| 6,462,935 B1 | 10/2002 | Shiue et al. | 361/511 |
| 6,580,598 B2 | 6/2003 | Shiue et al. | 361/502 |
| 6,659,298 B2 | 12/2003 | Wong | 215/373 |
| 6,661,643 B2 | 12/2003 | Shiue et al. | 361/502 |
| 7,014,829 B2 | 3/2006 | Yanagisawa et al. | 423/447.1 |
| 7,138,042 B2 | 11/2006 | Tran et al. | 204/551 |
| 7,175,783 B2 | 2/2007 | Curran | 252/511 |
| 7,267,753 B2 | 9/2007 | Anex et al. | 204/600 |
| 7,459,121 B2 | 12/2008 | Liang et al. | |
| 7,505,250 B2 | 3/2009 | Cho et al. | 361/321.4 |
| 7,600,567 B2 | 10/2009 | Christopher et al. | 166/275 |
| 7,706,128 B2 | 4/2010 | Bourcier | 361/502 |
| 7,761,809 B2 | 7/2010 | Bukovec et al. | 715/810 |
| 8,147,599 B2 | 4/2012 | McAlister | 96/154 |
| 8,361,321 B2 | 1/2013 | Stetson et al. | |
| 8,686,249 B1* | 4/2014 | Whitaker et al. | 800/320.1 |
| 9,028,663 B2 | 5/2015 | Stetson et al. | |
| 9,067,811 B1 | 6/2015 | Bennett et al. | |
| 9,095,823 B2 | 8/2015 | Fleming | |
| 9,193,587 B2 | 11/2015 | Bennett | |
| 2005/0170089 A1* | 8/2005 | Lashmore et al. | 427/248.1 |
| 2005/0189673 A1 | 9/2005 | Klug et al. | |
| 2009/0294300 A1 | 12/2009 | Kanzius | 205/687 |
| 2010/0025330 A1 | 2/2010 | Ratto et al. | 210/651 |
| 2010/0127312 A1 | 5/2010 | Grebel et al. | |
| 2010/0167551 A1 | 7/2010 | Dedontney | |
| 2012/0048804 A1 | 3/2012 | Stetson et al. | 210/653 |
| 2012/0183738 A1 | 7/2012 | Zettl et al. | |
| 2012/0255899 A1* | 10/2012 | Choi et al. | 210/489 |
| 2012/0292245 A1 | 11/2012 | Saito | |
| 2013/0015136 A1 | 1/2013 | Bennett et al. | |
| 2013/0105417 A1* | 5/2013 | Stetson et al. | 210/806 |
| 2013/0240355 A1 | 9/2013 | Ho et al. | |
| 2013/0248367 A1* | 9/2013 | Stetson et al. | 204/518 |
| 2013/0249147 A1 | 9/2013 | Bedworth | |
| 2013/0256210 A1 | 10/2013 | Fleming | |
| 2013/0256211 A1* | 10/2013 | Fleming | 210/321.76 |
| 2013/0277305 A1 | 10/2013 | Stetson et al. | |
| 2014/0261999 A1 | 9/2014 | Stetson et al. | |
| 2014/0263035 A1 | 9/2014 | Stoltenberg et al. | |
| 2014/0263178 A1 | 9/2014 | Sinton et al. | |
| 2014/0272286 A1 | 9/2014 | Stoltenberg et al. | |
| 2014/0318373 A1* | 10/2014 | Wood et al. | 96/11 |
| 2014/0377738 A1 | 12/2014 | Bachmann et al. | |
| 2015/0075667 A1 | 3/2015 | McHugh et al. | |
| 2015/0217219 A1 | 8/2015 | Sinsabaugh et al. | |
| 2015/0218210 A1 | 8/2015 | Stetson, Jr. | |
| 2015/0221474 A1 | 8/2015 | Bedworth | |
| 2015/0247178 A1 | 9/2015 | Mountcastle et al. | |
| 2015/0258254 A1 | 9/2015 | Simon et al. | |
| 2015/0258498 A1 | 9/2015 | Simon et al. | |
| 2015/0258502 A1 | 9/2015 | Turowski et al. | |
| 2015/0258503 A1 | 9/2015 | Sinton et al. | |
| 2015/0258525 A1 | 9/2015 | Westman et al. | |
| 2015/0268150 A1 | 9/2015 | Newkirk et al. | |
| 2015/0321147 A1 | 11/2015 | Fleming et al. | |
| 2015/0336202 A1 | 11/2015 | Bedworth et al. | |

FOREIGN PATENT DOCUMENTS

| | | | |
|---|---|---|---|
| JP | 2006188393 | 7/2006 | |
| KR | 10-20120022164 A | 3/2012 | B01D 39/20 |
| WO | WO 2009/129984 | 10/2009 | |
| WO | WO 2011/001674 | 6/2011 | |
| WO | WO 2012/006657 A1 | 1/2012 | C01B 31/04 |
| WO | WO 2012/030368 A1 | 3/2012 | B01J 16/12 |
| WO | WO 2013/138137 A1 | 9/2013 | C02F 1/44 |

OTHER PUBLICATIONS

Mishra et al.; *Functionalized Graphene Sheets for Arsenic Removal and Desalination of Sea Water*; Desalination, Elsevier, Amsterdam, NL; vol. 282; Jan. 13, 2011.

Karan et al.; *Ultrafast Viscous Permeation of Organic Solvents Through Diamond-Like Carbon Nanosheets*; Science; vol. 335; Jan. 27, 2012; pp. 444-447.

Nair et al; *Unimpeded Permeation of Water Through Helium-Leak-tight Graphene-Based Membranes*; Science; vol. 335; Jan. 27, 2012; pp. 442-443.

Suk et al.; *Water Transport Through Ultrathin Graphene*; Journal of Physical Chemistry Letters; Apr. 30, 2010; pp. 1590-1594.

Paul, Donald R.; *Creating New Types of Carbon-Based Membranes*; Science; vol. 335; Jan. 27, 2012; pp. 413-414.

International Search Report dated Jan. 5, 2012 in corresponding application No. PCT/US2011/047800.

Liu, Li et al., *Graphene Oxidation: Thickness-Dependent Etching and Strong Chemical Doping*; Nano Letters 2008; vol. 8, No. 7; Jun. 9, 2008, pp. 1965-1970.

Kim, Myungwoong et al., Fabrication and Characterization of Large-Area, Semiconducting Nanoperforated Graphene Materials; *Nano Letters* 2010, vol. 10, No. 4, Mar. 1, 2010, pp. 1125-1131.

Bae, Sukang et al., *Roll-to-roll production of 30 inch graphene films for transparent electrodes*; nature Nanotechnology; vol. 5, Jun. 20, 2010; pp. 574-578.

Morse, Jeff; *Review of Kim, Myungwoong et al.; Fabrication and Characterization of Large-Area, Semiconducting Nanoperforated Graphene Materials*; InterNano Resources for Nanomanufacturing; Apr. 30, 2010.

Sint, Kyaw; *Selective Ion Passage through Functionalized Graphene Nanopores*: JACS Communications; 2008; 130; 16448-16449.

Cohen-Tanugi, David; *Water Desalination across Nanoporous Graphene*; ACS Publications; MIT; 2012.

*Nanoporous Graphene Could Outperform Best Commercial Water Desalination Techniques*; Tanugi & Grossman; ACS 2012; Jun. 25, 2012; Weftec 2012; Sep. 29-Oct. 3.

Preliminary Amendment filed in corresponding U.S. Appl. No. 12/868,150.

Exhibit A as filed with Preliminary Amendment in corresponding U.S. Appl. No. 12/868,150.

Notice of Allowance received in corresponding U.S. Appl. No. 12/868,150.

Database WPI, Week 201238, Thomson Scientific, London, GB; AN 2012-D49442.

Written Opinion of the International Searching Authority dated Jan. 5, 2012, for International Patent Application No. PCT/US11/47800.

International Preliminary Report on Patentability dated Oct. 15, 2012, for International Patent Application No. PCT/US11/47800.

Handbook of Nanoscience, Engineering and Technology (2008), Goddard et al. eds. Chapter 11 Aluru et al. (2003) "Modeling Electronics at the Nanoscale".

First Office Action dated Jul. 30, 2014, from the State Intellectual Property Office of China for Chinese Patent Application No. 201180049184.5—Chinese and English translation.

International Preliminary Report of Patentability mailed Jun. 22, 2015, corresponding to International Application No. PCT/US2013/074942.

* cited by examiner

PERFORATED GRAPHENE DEIONIZATION OR DESALINATION

CROSS REFERENCE TO RELATED APPLICATION

This is a continuation-in-part application of application Ser. No. 12/868,150 filed Aug. 25, 2010, which is incorporated herein by reference.

BACKGROUND ART

As fresh water resources are becoming increasingly scarce, many nations are seeking solutions that can convert water that is contaminated with salt, most notably seawater, into clean drinking water.

Existing techniques for water desalination fall into four broad categories, namely distillation, ionic processes, membrane processes, and crystallization. The most efficient and most utilized of these techniques are multistage flash distillation (MSF), multiple effect evaporation (MEE) and reverse osmosis (RO). Cost is a driving factor for all of these processes, where energy and capital costs are both significant. Both RO and MSF/MEE technologies are thoroughly developed. Currently, the best desalination solutions require between two and four times the theoretical minimum energy limit established by simple evaporation of water, which is in the range of 3 to 7 kjoules/kg. Distillation desalination methods include multistage flash evaporation, multiple effect distillation, vapor compression, solar humidification, and geothermal desalination. These methods share a common approach, which is the changing of the state of water to perform desalination. These approaches use heat-transfer and/or vacuum pressure to vaporize saline water solutions. The water vapor is then condensed and collected as fresh water.

Ionic process desalination methods focus on chemical and electrical interactions with the ions within the solution. Examples of ionic process desalination methods include ion exchange, electro-dialysis, and capacitive deionization. Ion exchange introduces solid polymeric or mineral ion exchangers into the saline solution. The ion exchangers bind to the desired ions in solution so that they can be easily filtered out. Electro-dialysis is the process of using cation and anion selective membranes and voltage potential to create alternating channels of fresh water and brine solution. Capacitive deionization is the use of voltage potential to pull charged ions from solution, trapping the ions while allowing water molecules to pass.

Membrane desalination processes remove ions from solution using filtration and pressure. Reverse osmosis (RO) is a widely used desalination technology that applies pressure to a saline solution to overcome the osmotic pressure of the ion solution. The pressure pushes water molecules through a porous membrane into a fresh water compartment while ions are trapped, creating high concentration brine solution. Pressure is the driving cost factor for these approaches, as it is needed to overcome osmotic pressure to capture the fresh water.

Crystallization desalination is based on the phenomenon that crystals form preferentially without included ions. By creating crystallized water, either as ice or as a methyl hydrate, pure water can be isolated from dissolved ions. In the case of simple freezing, water is cooled below its freezing point, thereby creating ice. The ice is then melted to form pure water. The methyl hydrate crystallization processed uses methane gas percolated through a saltwater solution to form methane hydrate, which occurs at a lower temperature than at which water freezes. The methyl hydrate rises, facilitating separation, and is then warmed for decomposition into methane and desalinated water. The desalinated water is collected, and methane is recycled.

Evaporation and condensation for desalination is generally considered to be energy efficient, but requires a source of concentrated heat. When performed in large scale, evaporation and condensation for desalination are generally co-located with power plants, and tend to be restricted in geographic distribution and size.

Capacitive deionization is not widely used, possibly because the capacitive electrodes tend to foul with removed salts and to require frequent service. The requisite voltage tends to depend upon the spacing of the plates and the rate of flow, and the voltage can be a hazard.

Reverse osmosis (RO) filters are widely used for water purification. The RO filter uses a porous or semipermeable membrane typically made from cellulose acetate or polyimide thin-film composite, typically with a thickness in excess of 200 microns. These materials are hydrophilic. The membrane is often spiral-wound into a tube-like form for convenient handling and membrane support. The membrane exhibits a random-size aperture distribution, in which the maximum-size aperture is small enough to allow passage of water molecules and to disallow or block the passage of ions such as salts dissolved in the water. Notwithstanding the one-millimeter thickness of a typical RO membrane, the inherent random structure of the RO membrane defines long and circuitous or tortuous paths for the water that flows through the membrane, and these paths may be much more than one millimeter in length. The length and random configuration of the paths require substantial pressure to strip the water molecules at the surface from the ions and then to move the water molecules through the membrane against the osmotic pressure. Thus, the RO filter tends to be energy inefficient.

FIG. 1 is a notional illustration of a cross-section of an RO membrane 10. In FIG. 1, membrane 10 defines an upstream surface 12 facing an upstream ionic aqueous solution 16 and a downstream surface 14. The ions that are illustrated on the upstream side are selected as being sodium (Na) with a + charge and chlorine (Cl) with a − charge. The sodium is illustrated as being associated with four solvating water molecules ($H_2O$). Each water molecule includes an oxygen atom and two hydrogen (H) atoms. One of the pathways 20 for the flow of water in RO membrane 10 of FIG. 1 is illustrated as extending from an aperture 20u on the upstream surface 12 to an aperture 20d on the downstream surface 14. Path 20 is illustrated as being convoluted, but it is not possible to show the actual tortuous nature of the typical path. Also, the path illustrated as 20 can be expected to be interconnected with multiple upstream apertures and multiple downstream apertures. The path(s) 20 through the RO membrane 10 are not only convoluted, but they may change with time as some of the apertures are blocked by unavoidable debris.

Alternative water desalination, deionization, or fluid separation is desired.

SUMMARY OF THE INVENTION

In light of the foregoing, it is a first aspect of the present invention to provide perforated graphene deionization or desalination.

It is another aspect of the present invention to provide a method for deionizing fluid carrying unwanted ions, the method comprising providing at least one sheet of graphene with plural perforated apertures selected to allow the passage of fluid and to disallow the passage of a at least one of the unwanted ions, forming the at least one sheet of graphene into a cylindrical form, inserting the cylindrical form into a housing, pressurizing the fluid carrying unwanted ions to thereby generate pressurized fluid to flow through the housing, applying the pressurized fluid to a first surface of the at least one perforated graphene in the cylindrical form, so that fluid flows to a second side of the at least one perforated graphene sheet in cylindrical form in preference to ions, and collecting the fluid from the second side of the at least one graphene sheet.

Still another aspect of the present invention is to provide a fluid deionizer, comprising a cylindrical form of at least one graphene sheet perforated with apertures dimensioned to allow the flow of fluid and to disallow the flow of ions of at least one particular type, a source of fluid laden with ions of the particular type, and a path for the flow of the fluid laden with ions of the at least one particular type through the cylindrical form of at least one graphene sheet perforated with apertures.

Yet another aspect of the present invention is to provide a fluid deionizer comprising at least one graphene sheet perforated with apertures dimensioned to allow a flow of fluid and to disallow at least one particular type of ion contained in the flow of fluid, a support chamber carrying the at least one graphene sheet, the support chamber having an upstream portion that receives the at least one graphene sheet, a source of fluid laden with the at least one particular type of ion, a path for the flow of the fluid laden with the at least one particular type of ion through the at least one graphene sheet perforated with apertures, and a purge valve associated with the upstream portion, the purge valve placed in an open position so as to collect the at least one particular type of ion disallowed by the at least one graphene sheet.

Still another aspect of the present invention is to provide a method for separating components from a medium, comprising providing a primary sheet of at least one layer of graphene with plural perforated apertures selected to allow the passage of a medium and to disallow the passage of selected components in the medium, providing the primary sheet of at least one layer of graphene in a primary chamber, the primary chamber having a primary inlet, a primary outlet, and a primary lower flow path, and pressurizing the medium to flow in a path substantially parallel to the primary sheet of at least one layer of graphene from the primary inlet to the primary outlet, the medium flowing on to a first surface of the primary sheet of at least one layer of graphene so that a portion of the medium flows to a second side of the primary sheet of at least one layer of graphene through the plural perforated apertures while a remaining portion of the medium and the disallowed selected components in the medium flow out the primary outlet.

Yet another aspect of the present invention is to provide a separation apparatus, comprising at least one chamber having an inlet, an outlet and a lower flow path, at least one sheet of graphene perforated with apertures dimensioned to allow passage of a medium and to disallow passage of selected components in the medium, the at least one sheet of graphene positioned in the at least one chamber, and a pressurized source of the medium connected to the at least one chamber having the inlet, the pressurized source directing the medium along a path substantially parallel to the at least one sheet of graphene from the inlet to the outlet, the medium flowing on to a first surface of the at least one sheet of graphene so that a portion of the medium flows to a second side of the at least one graphene sheet through the plural perforated apertures while a remaining portion of the medium and the disallowed selected components in the medium flow out the outlet.

BEST MODE FOR CARRYING OUT THE INVENTION

Figure 1:
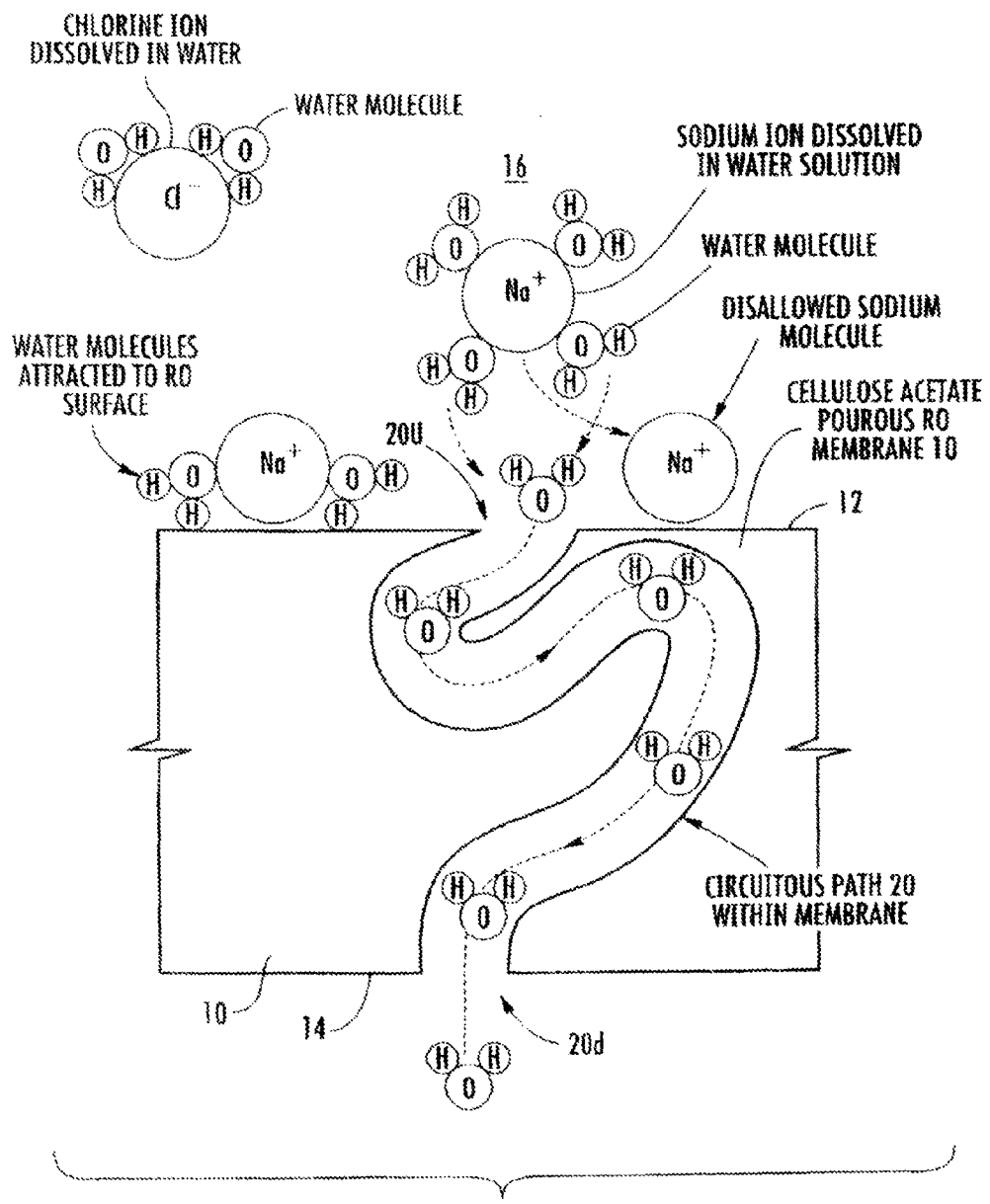
FIG. 1 is a notional cross-sectional representation of a prior-art reverse osmosis (RO) filter membrane.
Figure 2:
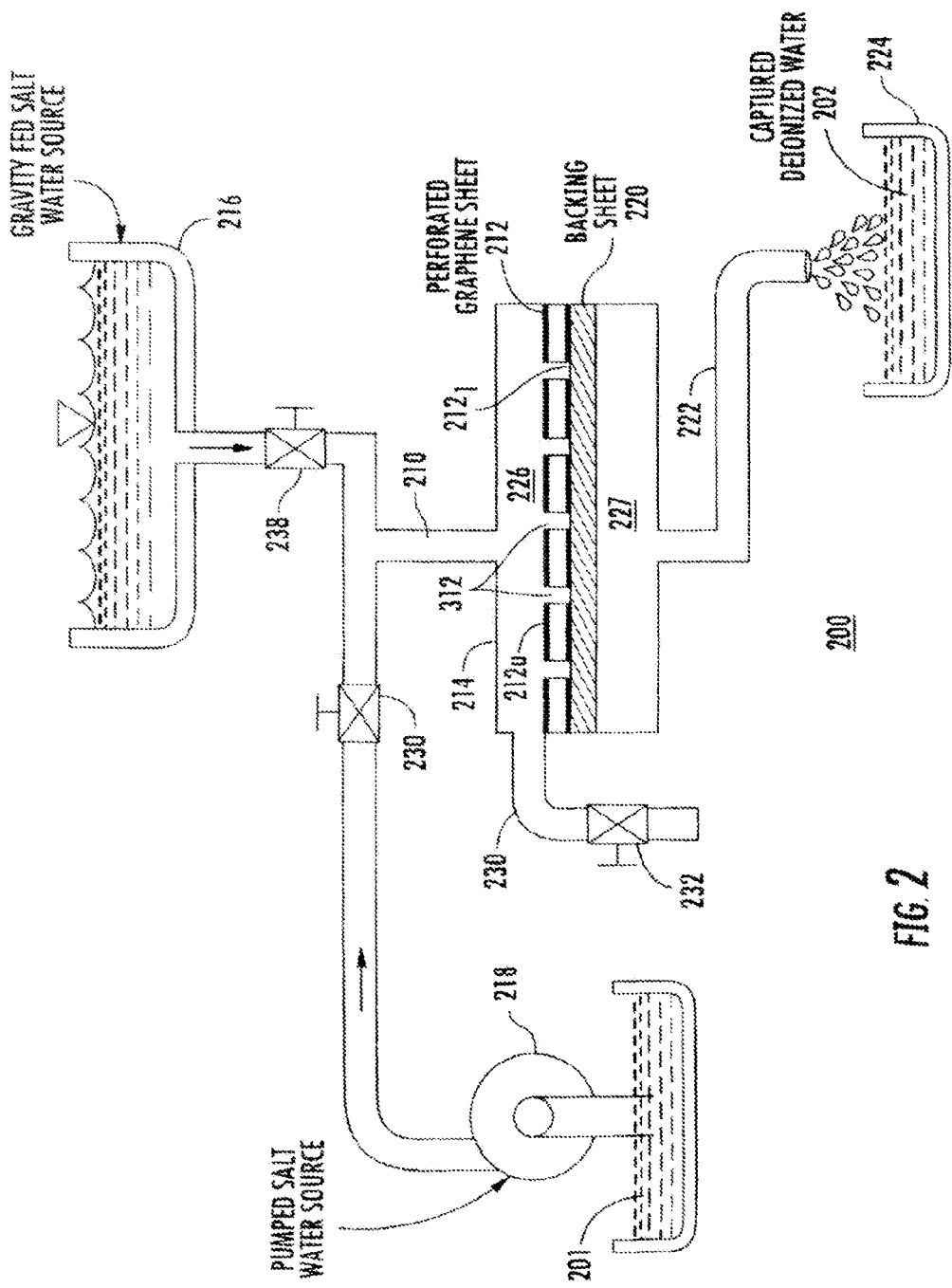
FIG. 2 is a notional representation of a water filter according to an aspect of the disclosure, using a perforated graphene sheet.
Figure 3:
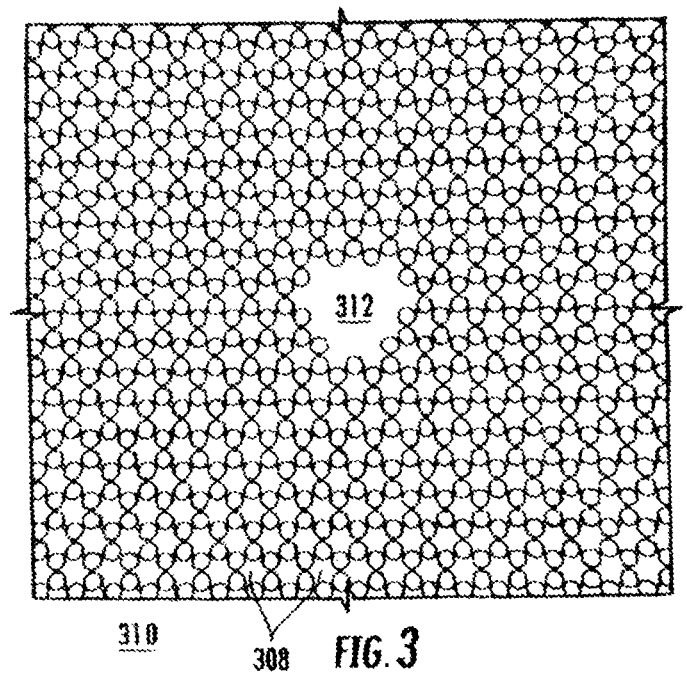
FIG. 3 is a plan representation of a perforated graphene sheet which may be used in the arrangement of FIG. 2, showing the shape of one of the plural apertures.

FIG. 2 is a notional representation of a basic desalination, desalinization or deionization apparatus 200 according to an exemplary embodiment or aspect of the disclosure. In FIG. 2, a channel 210 conveys ion-laden water to a filter membrane 212 mounted in a supporting chamber 214. The ion-laden water may be, for example, seawater or brackish water. In one exemplary embodiment, the filter membrane 212 can be wound into a spiral in known manner. Flow impetus or pressure of the ion-laden water flowing through channel 210 of FIG. 2 can be provided either by gravity from a tank 216 or from a pump 218. Valves 236 and 238 allow selection of the source of ion-laden water. In apparatus or arrangement 200, filter membrane 212 is a perforated graphene sheet. Graphene is a single-atomic-layer-thick layer of carbon atoms, bound together to define a sheet 310, as illustrated in FIG. 3. The thickness of a single graphene sheet is approximately 0.2 to 0.3 nanometers (nm). Multiple graphene sheets can be formed, having greater thickness and correspondingly greater strength. Multiple graphene sheets can be provided in multiple layers as the sheet is grown or formed. Or multiple graphene sheets can be achieved by layering or positioning one sheet on top or another. For all the embodiments disclosed herein, a single sheet of graphene or multiple graphene sheets may be used. Testing reveals that multiple layers of graphene maintain their integrity and function as a result of self-adhesion. This improves the strength of the sheet and in some cases flow performance. The carbon atoms of the graphene sheet 310 of FIG. 3 define a repeating pattern of hexagonal ring structures (benzene rings) constructed of six carbon atoms, which form a honeycomb lattice of carbon atoms. An interstitial aperture 308 is formed by each six carbon atom ring structure in the sheet and this interstitial aperture is less than one nanometer across. Indeed, skilled artisans will appreciate that the interstitial aperture 308 is believed to be about 0.23 nanometers across its longest dimension. Accordingly, the dimension and configuration of the aperture 308 and the electron nature of the graphene precludes transport of any molecule across the graphene's thickness unless there are perforations. This dimension is much too small to allow the passage of either water or ions. In order to form the perforated graphene sheet 212 of FIG. 2, one or more perforations are made, as illustrated in FIG. 3. A representative generally or nominally round aperture 312 is defined through the graphene sheet 310. Aperture 312 has a nominal diameter of about 0.6 nanometers. The 0.6 nanometer dimension is selected to block the smallest of the ions which would ordinarily be expected in salt or brackish water, which is the sodium ion. The generally round shape of the aperture 312 is affected by the fact that the edges of the aperture are defined, in part, by the hexagonal carbon ring structure of the graphene sheet 310.

Aperture 312 may be made by selective oxidation, by which is meant exposure to an oxidizing agent for a selected period of time. It is believed that the aperture 312 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures comprising a single sheet or multiple sheets. The structures may be graphene nanoplatelets and graphene nanoribbons. Thus, apertures in the desired range can be formed by shorter oxidation times. Another more involved method as described in Kim et al. "*Fabrication and Characterization of Large Area, Semiconducting Nanoperforated Graphene Materials*," Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce a perforated graphene sheet or sheets.

As mentioned, the graphene sheet 310 of FIG. 3 has a thickness of but a single atom. Thus, the sheet tends to be flexible. The flex of the graphene sheet can be ameliorated by applying a backing structure to the sheet 212 or by providing more than one graphene sheet. In FIG. 2, a backing structure, which may also be referred to as a backing sheet, of perforated graphene sheet 212 is illustrated as 220. Backing structure 220 in this embodiment is a sheet of perforated polytetrafluoroethylene, sometimes known as polytetrafluoroethane. The structure 220 may also be perforated polycarbonate film, nanostructured carbon, other suitable polymeric materials, or sintered porous metal. A thickness of the backing sheet may be, for example, from one hundred microns to one millimeter (mm).

It should be noted that, in the apparatus or arrangement of FIG. 2, the pressure of ion-laden water applied through path 210 to the perforated membrane 212 can be provided by gravity from tank 216, thereby emphasizing one of the aspects of the apparatus 200. That is, unlike the RO membrane, the perforated graphene sheet 312 forming the perforated membrane 212 is hydrophobic, and the water passing through the pierced apertures (312 of FIG. 3) is not impeded by the attractive forces attributable to wetting. Also, as mentioned, the length of the flow path through the apertures 312 in graphene sheet 310 is equal to the thickness of the sheet, which is about 0.2 to 0.3 nm. This length is much less than the lengths of the random paths extending through a RO membrane. Consequently, very little pressure is required to provide fluid flow, or conversely, the flow at a given pressure is much greater in the perforated graphene sheet 310. This, in turn, translates to a low energy requirement for ion separation. It is known to those skilled in the art that the pressure required in a RO membrane to force water through the membrane against osmotic pressure includes a frictional component which results in heating of the membrane. Consequently, some of the pressure which must be applied to the RO membrane does not go toward overcoming osmotic pressure, but instead goes into heat. Simulated results show that the perforated graphene sheet reduces the required pressure significantly. Additionally, energy savings resulting from reduced pretreatment and reduced fouling over time resulting from graphene's chemical and biological neutrality will also result in significant savings. As mentioned, the perforations 312 in graphene sheet 212 of FIG. 2 (or equivalently graphene sheet 310 of FIG. 3) or multiple graphene sheets in either embodiment are dimensioned to disallow the passage of the smallest ions to be expected in the source water. Consequently, any ions equal to or larger in size than the smallest will not pass through the perforated graphene sheet 212, and such ions can be expected to accumulate in an upstream side 226 of the graphene-sheet-supporting chamber 214. This accumulation of ions in upstream "chamber" 226 is referred to herein as "sludge," and will eventually reduce the flow of water through the perforated graphene sheet 212, thereby tending to render it ineffective for deionization. As illustrated in FIG. 2, a further path 230 is provided, together with a discharge valve 232, to allow purging or discharge of the sludge. Thus, operation of the apparatus or arrangement 200 of FIG. 2 may be in a "batch" mode. The first mode of the batch operation occurs with flow of ion-laden water through path 210, with discharge valve 232 closed to prevent flow. The ion-laden water fills the upstream side 226 of the support chamber 214. The water molecules are allowed to flow through perforated graphene sheet 212 of FIG. 2 and through the backing sheet 220 to the downstream side 227 of the support chamber 214. Thus, deionized water accumulates in downstream portion 227 for a period of time, and is available to be drawn off through a path 222 to a capture vessel illustrated as a tank 224. Eventually, the accumulation or concentration of ions in upstream portion 226 of the support chamber will tend to reduce the flow of water through the perforated graphene sheet 212. In order to purge the concentrated ion/water mix accumulated on or in the upstream chamber or side 226, valve 232 is opened, which allows the concentrated ion/water mix to be purged while the upstream portion 226 refills with ion-laden water from tank 216 or pump 218. Valve 232 is then closed and another filtration cycle begins. This results in the production of deionized water and accumulation of the deionized water in container 224.

Figure 4:
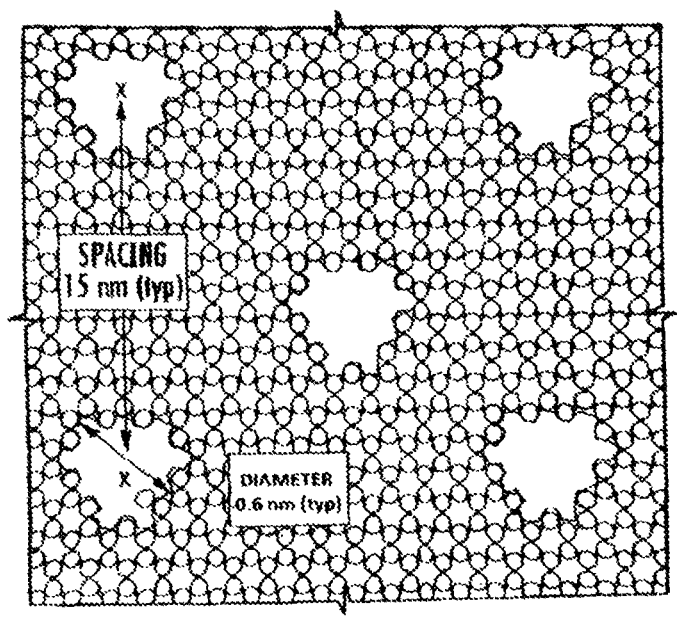
FIG. 4 is a plan view of a perforated graphene sheet, showing 0.6 nanometer diameter perforations or apertures and interperforation dimensions.

FIG. 4 is a representation of a graphene sheet with a plurality of perforations such as that of FIG. 3. The sheet of FIG. 4 defines [three, four, or five] apertures. In principle, the flow rate will be proportional to the aperture density. As the aperture density increases, the flow through the apertures may become "turbulent," which may adversely affect the flow at a given pressure. Also, as the aperture density increases, the strength of the underlying graphene sheet may be locally reduced. Such a reduction in strength may, under some circumstances, result in rupture of the membrane. The center-to-center spacing between apertures is believed to be near optimum for the 0.6 nanometer apertures at a value of fifteen nanometers.

Figure 5:
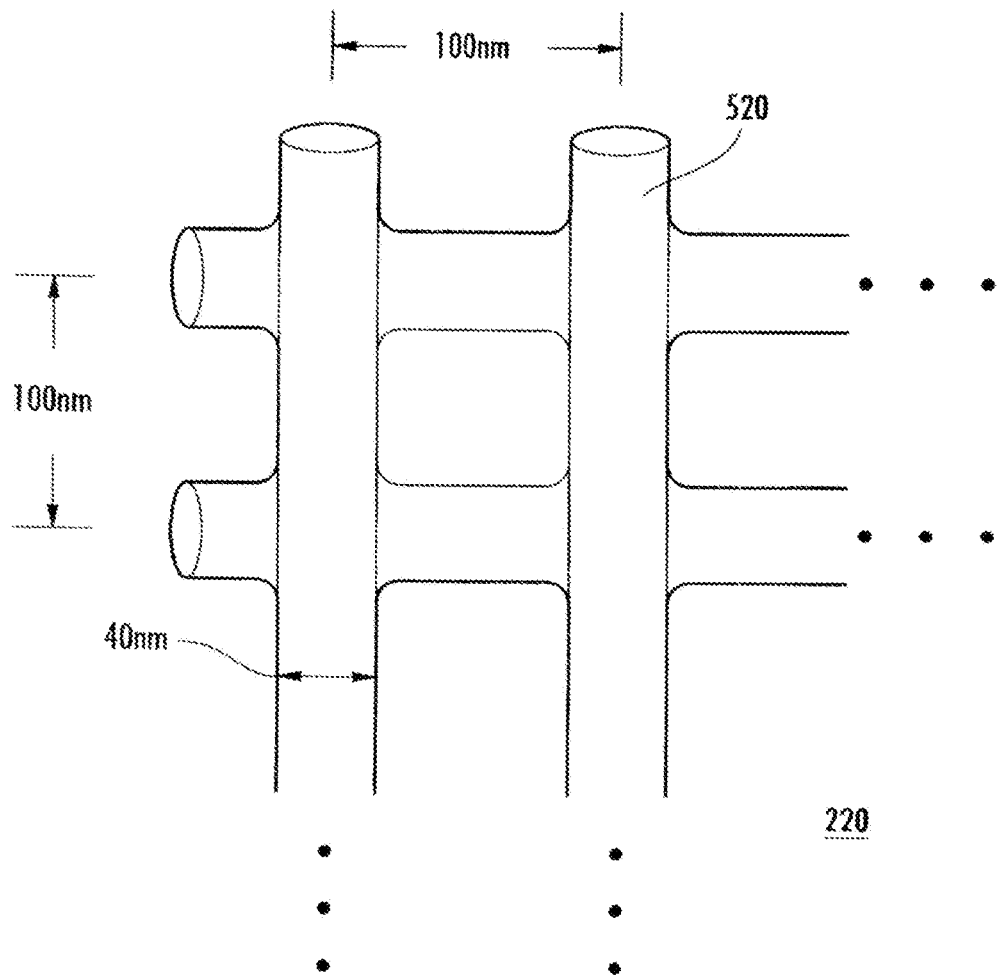
FIG. 5 is a plan representation of a backing sheet that may be used in conjunction with the perforated graphene sheet of FIG. 2.

FIG. 5 is a simplified illustration of the structure of a backing sheet which may be used with the graphene sheet of FIG. 2 or if multiple graphene sheets are used. In FIG. 5, backing sheet 220 is made from filaments 520 of polytetrafluoroethylene, also known as polytetrafluoroethane, arranged in a rectangular grid and bonded or fused at their intersections. The backing sheet 220 may also be perforated polycarbonate film, nanostructured carbon, other suitable polymeric materials, or sintered porous metal. As with the perforated graphene sheet, the dimensions in the backing sheet should be as large as possible for maximum flow, commensurate with sufficient strength. The spacing between mutually adjacent filaments 520 oriented in the same direction can be nominally 100 nm, and the filaments may have a nominal diameter of 40 nm. The tensile strength of the graphene sheet is great, and so the relatively large unsupported areas in the backing sheet should not present problems.

Figure 6:
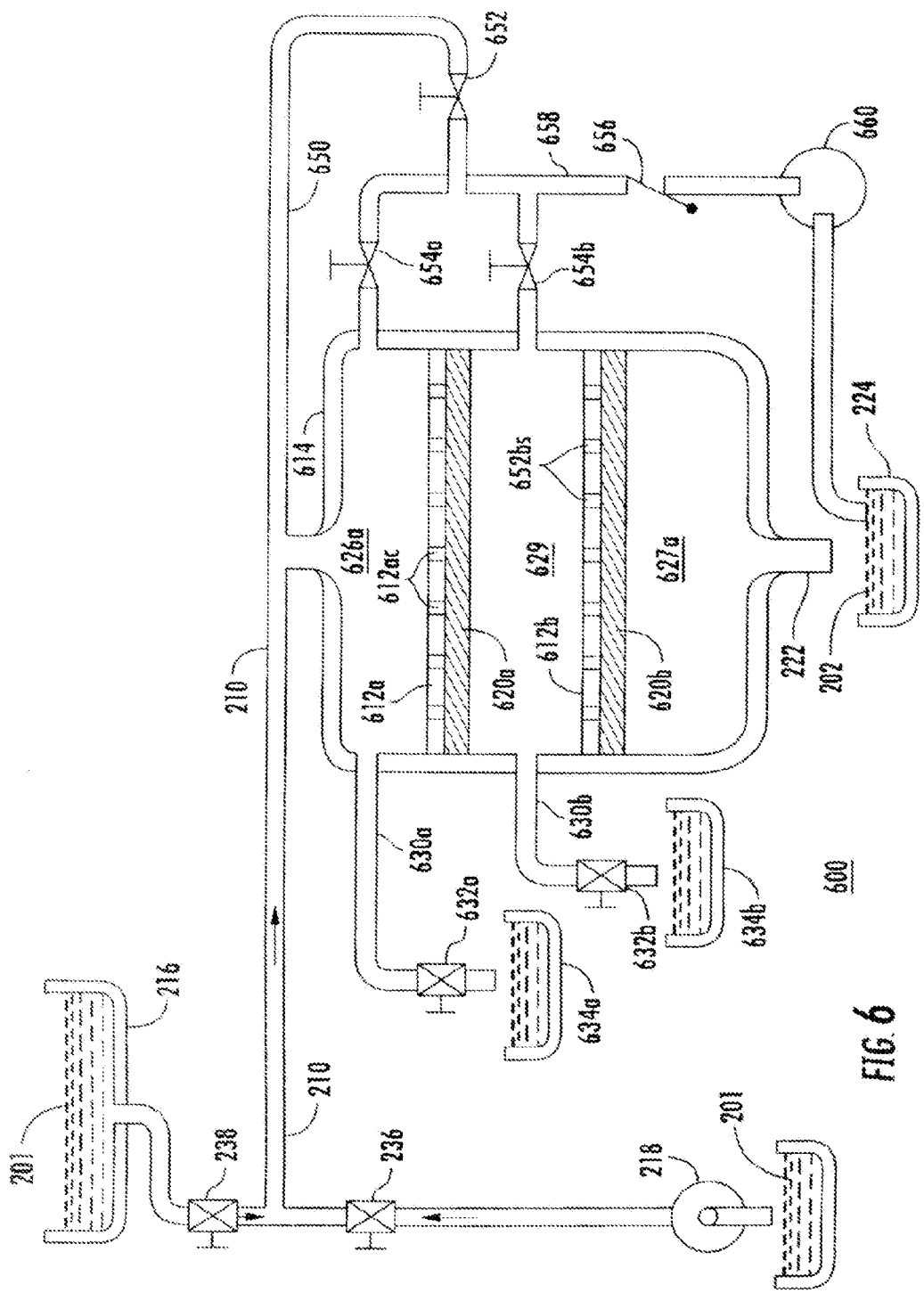
FIG. 6 is a notional representation of a water deionization filter according to aspects of the disclosure, using multiple perforated graphene sheets for separation of the concentrated ions.

FIG. 6 is a notional illustration of a deionization or desalination apparatus 600 according to another embodiment or aspect of the disclosure, in which multiple layers of differently-perforated graphene sheets are used. In FIG. 6, elements corresponding to those of FIG. 2 are designated by like reference alphanumerics. It will be appreciated that each "layer" in FIG. 6 may be a single sheet of graphene or multiple sheets of graphene. Within support chamber 614 of FIG. 6, upstream and downstream perforated graphene sheets 612a and 612b, respectively, divide the chamber into three volumes or portions, namely an upstream portion or chamber 626a, a downstream portion or chamber 626b, and an intermediate portion or chamber 629. Each perforated graphene sheet 612a and 612b is associated with a backing sheet. More particularly, perforated graphene sheet 612a is backed by a sheet 620a, and perforated graphene sheet 612b is backed by a sheet 620b. The perforations of the perforated graphene sheets 612a and 612b differ from one another. More particularly, upstream graphene sheet 612a is perforated by apertures 612ac selected to disallow or disable the flow of chlorine ions and to enable the flow of water laden with sodium ions; these apertures are 0.9 nanometers in nominal diameter. Thus, chlorine ions, having a greater effective diameter than 0.9 nanometers, cannot pass through perforated graphene sheet 612a, but remain in the upstream portion or chamber 626a. Water laden with sodium ions can flow through perforated graphene sheet 612a into intermediate chamber 629. Downstream perforated graphene sheet 612b is perforated with apertures 652bs selected to disallow or disable the flow of sodium ions and to enable the flow of water molecules; these apertures are 0.6 nanometers in nominal diameter. Thus, chlorine ions, having a greater effective diameter than 0.9 nanometers, cannot pass through apertures 612ac of perforated graphene sheet 612a, but water laden with sodium ions can flow through the apertures 612ac of perforated graphene sheet 612a into intermediate chamber 629. Sodium ions cannot pass through downstream perforated graphene sheet 612b, and so remain or accumulate in intermediate portion or chamber 629. The water molecules (H2O), free of at least chlorine and sodium ions, can flow from intermediate portion or chamber 629 through apertures 652bs of perforated graphene sheet 612b and into downstream portion or chamber 626b, from whence the deionized water can be collected through path 222 and collection vessel 224.

As with the case of the deionization arrangement 200 of FIG. 2, the apparatus or arrangement 600 of FIG. 6 accumulates or concentrates ions during deionization operation. Unlike the apparatus or arrangement of FIG. 2, however, deionizer 600 produces at least partially separated concentrations of ions. More particularly, with a flow of water laden with chlorine and sodium ions, upstream portion or chamber 626a of apparatus 600 accumulates a sludge concentration consisting principally of chlorine ions, and intermediate portion or chamber 629 accumulates a concentration principally of sodium ions. These concentrated ions can be separately extracted by selective control of purging connections 630a and 630b and their purge valves 632a and 632b, respectively. More particularly, valve 632a can be opened to allow the concentrated chlorine ions to flow from upstream portion or chamber 626a to a collecting vessel illustrated as a tank 634a, and valve 632b can be opened to allow the concentrated sodium ions to flow from intermediate portion or chamber 629 to a collecting vessel illustrated as a tank 634b. Ideally, purge valve 632a is closed before purging of intermediate portion or tank 629 is begun, so that some pressure is maintained across perforated graphene sheet 612a to provide a flow of water through perforated graphene sheet 612a to aid in flushing the sodium-ion-rich sludge from the intermediate chamber 629. Purge valves 632a and 632b are closed prior to proceeding with the deionization. The purged and collected concentrated ions have economic value, as for conversion into solid form in the case of sodium or gaseous form in the case of chlorine. It should be noted that sea water contains significant amounts of beryllium salts, and these salts, if preferentially concentrated, have value to the pharmaceutical industry as a catalyst.

Also illustrated in FIG. 6 are cross-flow valves 654a and 654b, communicating between a flow path 658 and upstream portion or chamber 626a and intermediate portion or chamber 626b, respectively. Unfiltered water 201 loaded with ions can be routed to flow path 658 by opening valve 652, or deionized water 202 can be provided from tank 224 by operating a pump 660. From pump 660, the deionized water flows through a check valve 656 to path 658. Cross-flow valves 654a and 654b are opened and closed simultaneously with purge valves 632a and 632b, respectively, to thereby aid in purging the sludge from the chambers.

Figure 7:
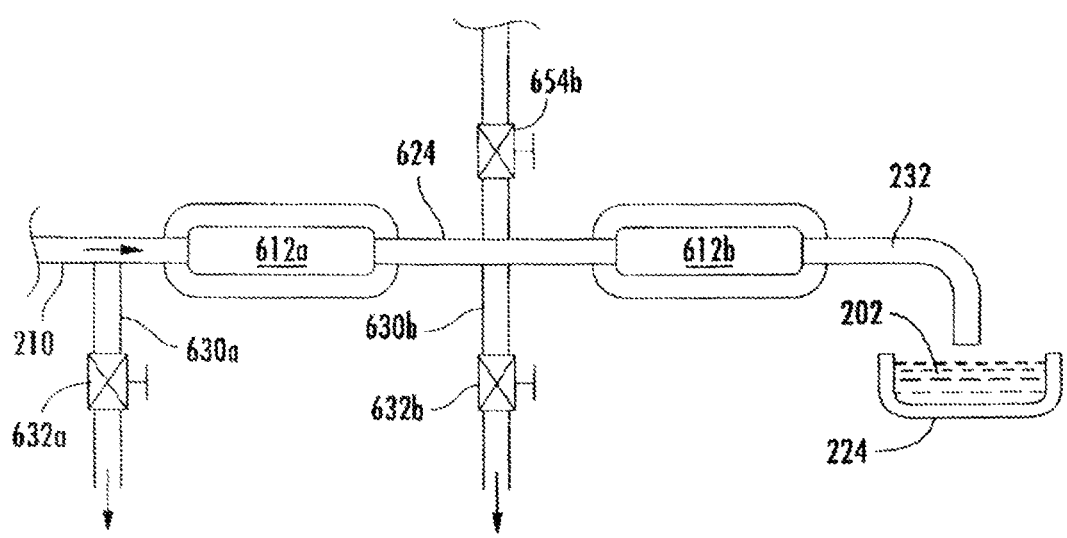
FIG. 7 is a simplified diagram illustrating a plumbing arrangement corresponding generally to the arrangement of FIG. 6, in which the perforated graphene sheets are spirally wound and enclosed in cylinders.

FIG. 7 is a simplified representation of a deionizing or ion separating arrangement according to an aspect of the disclosure. Elements of FIG. 7 corresponding to those of FIG. 6 are designated by like reference alphanumerics. In FIG. 7, the perforated graphene sheets 612a and 612b are rolled or spiral-wound into cylindrical form, and inserted into housings illustrated as 712a and 712b, respectively, as know from the RO membrane arts. As in the other embodiments, the graphene sheets 612a and 612b may be a single sheet of graphene or multiple sheets of graphene. And, as in the previous embodiments, multiple sheets improve their collective strength and flow performance.

Those skilled in the art will understand that ions other than chlorine and sodium may be removed from water by selectively perforated graphene sheets.

Figure 8:
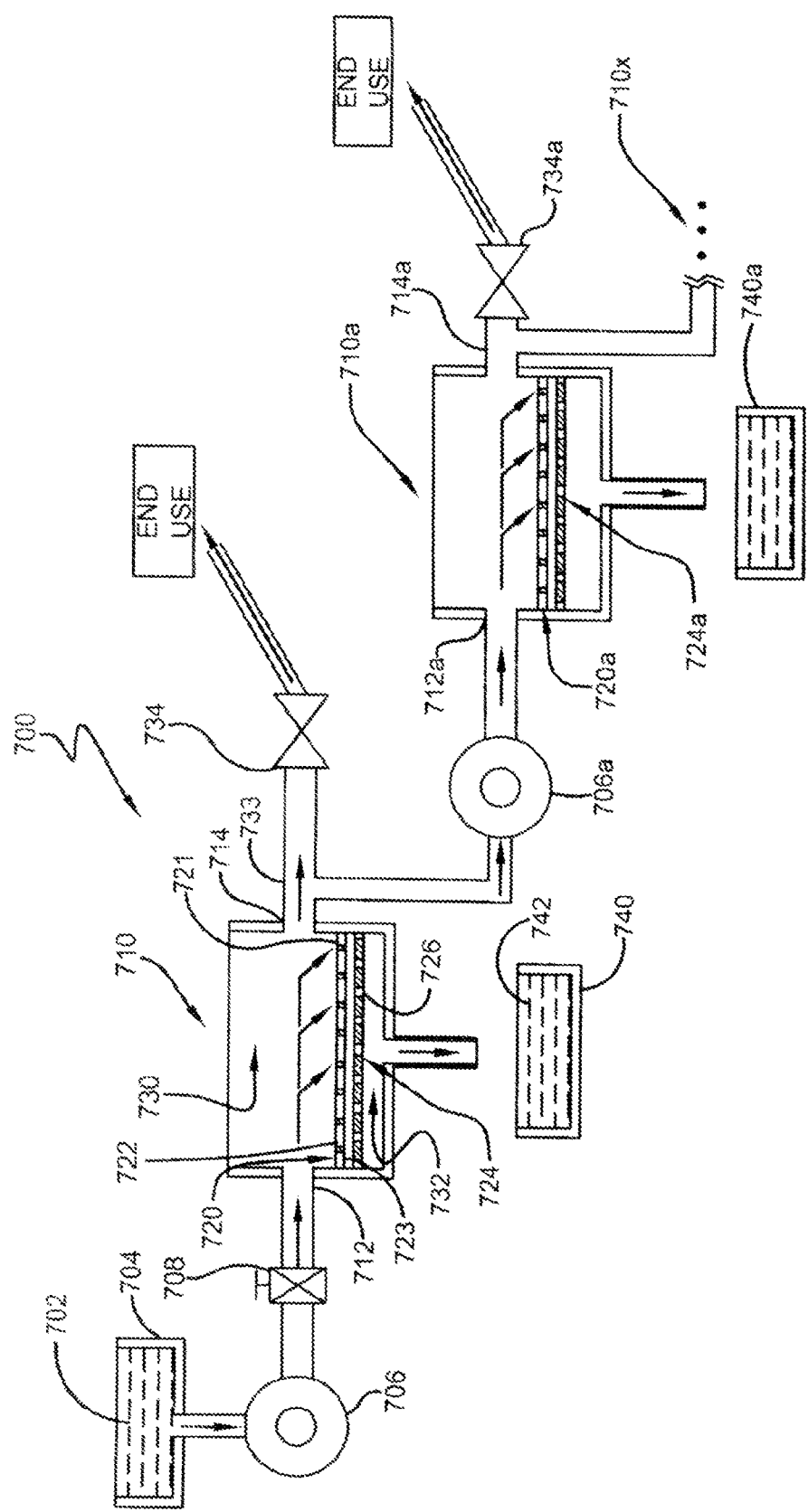
FIG. 8 is a notional representation of a separation apparatus according to aspects of the disclosure.

FIG. 8 is a simplified representation of a cross-flow separation apparatus according to an aspect of the disclosure. The separation apparatus, designated generally by the numeral 700, is configured to deionize, desalinate or otherwise separate a selected component from another, such as gasses, particulates, solutes, molecules, and hydrocarbons or any other nano-sized or micro-sized constituent from a medium. In the present embodiment, an unfiltered or prefiltered medium 702 is provided in a container 704 of appropriate size. The medium may constitute a fluid or a gas or combination thereof which contains components that are to be separated from one another. The unfiltered medium 702 is delivered by gravity or otherwise to a high-pressure pump 706 which propels the medium along a conduit or pipe that may or may not have a valve 708. If the valve 708 is provided and is in an open condition, the unfiltered medium enters a cross-flow chamber designated generally by the numeral 710. The chamber is provided with a cross-flow inlet 712 at one end and a cross-flow outlet 714 at an opposite end. Positioned in the chamber 710 at a position relatively lower than the inlet and outlet is a graphene membrane 720.

As in the previous embodiments, the graphene membrane 720, either a single sheet or multiple sheets, has a plurality of perforated apertures 721 which are sized as appropriate to allow selected portions of the medium to pass through while disallowing other portions of the medium from passing through. Generally, perforation aperture diameters for gas separation range from 0.2 to 0.6 nm, for salts from 0.6 to 2 nm, and hydrocarbon molecules from 10 to 100 nm. As in the previous embodiments, the membrane 720 is a single-atomic-layer-thick layer of carbon atoms bound together to define a sheet. The thickness of a single graphene sheet is approximately 0.2 to 0.3 nanometers (nm). The membrane has a first or top surface 722 that is exposed to the pressurized flow of the medium and a second or underlying surface 723 that is opposite the surface 722. All of the characteristics and attributes of the graphene sheets described in the previous embodiments are provided in the present embodiment. However, in the present embodiment the apertures may range in size from an effective diameter of 0.6 nanometers to an effective diameter of 1.2 nanometers as appropriate for filtering or separating the medium provided. In other words, some of the apertures may have a diameter of 0.6 nanometers, some 0.9 nanometers, and still others 1.2 nanometers. Any combination and proportion of different sized apertures may be used. In the case of desalinating or deionizing water this range of apertures is believed sufficient to disallow a majority of sodium ions and chlorine ions from passing through the graphene membrane while allowing water molecules to pass through. In other embodiments, for the cross-flow geometry apparatus, perforation diameters for gas separation range from 0.2 to 0.6 nm, for separation of salts from 0.6 to 2 nm, and for separation of hydrocarbon molecules from 10 to 100 nm. Other selected ranges between 0.2 nm and 100 nm may be used depending upon the configuration of the medium and the constituents to be disallowed. Moreover, specific ranges of diameters within the 0.2 nm to 100 nm range may be used.

In some embodiments a backing sheet or structure such as a supporting membrane 724 may be disposed underneath the graphene membrane 722 for support of the membrane. In other words, the supporting membrane 724 is positioned adjacent the surface 723 of the membrane 720. The backing membrane is perforated with apertures 726 which are substantially larger than the apertures 721. The supporting membrane 724 may be constructed of polytetrafluoroethylene, which is sometimes referred to as polytetrafluoroethane. Other materials for the membrane 724 may be perforated polycarbonate film, nanostructured carbon, other suitable polymeric materials, or sintered porous metal.

With the graphene membrane 720 inserted and positioned into the chamber 710, an upper flow path 730 is formed. The upper flow path allows for the pressurized fluid to flow in a direction substantially parallel with the membrane from the inlet 712 toward the outlet 714. As a result, the medium flows tangentially across the membrane and the portions of the medium that are sized to proceed through the various apertures 721 and, if provided, through the supporting membrane 724, into a lower flow path 732 that is beneath the graphene membrane. Those constituents that do not flow through the apertures are directed through the outlet 714 along a conduit 733 which may be provided with a valve 734. From the valve, the unfiltered medium (disallowed components) is then directed to a particular end use. For example, if water is the medium, the collected sodium and chlorine ions are collected for energy recovery use, such as in a galvanic battery or any other application. The purified medium collected in the lower flow path is then directed to a collection vessel 740 which holds the purified material or medium 742.

From the foregoing description it will be appreciated that the pressurized flow of the medium in a direction substantially parallel with the membrane, or in other words tangentially directed, allows for the medium to flow through the apertures while also allowing for the collected disallowed material to be moved along toward the outlet. Such a "cleaning" of the membrane prevents caking or other undesired collection of the disallowed material on the membrane. This is believed to assist the flow-through of the allowed or purified material 742 to be collected in the vessel 740.

In some embodiments the apparatus 700 may include any number of downstream cross-flow chambers 710, wherein each chamber and related components are provided with an alphabetic suffix. Accordingly, the disallowed fluid material flowing through the chamber outlet 714 is directed to a secondary high pressure pump 706a which directs the fluid into a chamber 710a that is constructed in substantially the same manner as the chamber 710. As a result, the previously disallowed components and medium are further purified so as to collect in a vessel 740a whereas the disallowed material is directed through the outlet to a valve 734a which collects the disallowed material for some other end use. For example, for removal of selected specific sized ions, analytes or particulates, a first chamber 710 and associated graphene sheet is first exposed to the medium, wherein the first graphene sheet has larger sized diameter apertures and distribution than a second chamber 710a and associated graphene sheet which has smaller aperture diameters and distribution. If provided, additional chambers 710b-x would provide corresponding graphene sheets with further reductions in aperture size. In other words, the staged cross-flow chambers 710 can be arranged so that they are less selective of ions at a first chamber and progressively more selective of ions at downstream chambers. As a result, it is believed that much less work or pumping force is needed at each incremental stage to obtain a desired level of filtration for the medium. This is advantageous in that the apparatus provides much improved filtering with much lower required energy per incremental salt removal step.

A method for deionizing water carrying unwanted ions (201) comprises the steps of perforating a sheet of graphene (310) with plural apertures (such as 312) selected to allow the passage of water molecules and to disallow the passage of a selected one of the unwanted ions (Na, for example), to thereby generate perforated graphene (212). As an alternative, a graphene sheet so perforated may be provided. The water carrying unwanted ions (201) is pressurized (216, 218) to thereby generate pressurized water. The pressurized water is applied to a first (212u) surface of the perforated graphene (212), so that water molecules flow to a second side (212d) of the perforated graphene sheet in preference to ions. The water molecules (202) are collected at the second side (212d) of the graphene sheet. In one mode of this method, the selected one of the ions is chlorine, the apertures for disallowance of the chlorine ions are nominally of 0.9 nanometers diameter, and the apertures are nominally spaced apart by fifteen nanometers. In another mode of this method, the selected one of the ions is sodium, and the apertures for disallowance of the sodium ions of nominally 0.6 nanometers diameter, and the apertures' are nominally spaced apart by fifteen nanometers. The method may include the step of reinforcing the sheet of perforated graphene (212) with a backing (220), which may be a polytetrafluoroethylene grid (520).

A method for deionizing water (201) carrying unwanted ions comprises the steps of perforating a first sheet (612a) of graphene with plural apertures (312) of a diameter selected to disallow the passage of a selected first one of the unwanted ions (chlorine, for example), and to allow the passage of water molecules laden with a selected second one of the unwanted ions (sodium, for example), to thereby generate a first sheet of perforated graphene (612a). A second sheet of graphene (612b) is perforated with plural apertures selected to allow the passage of water molecules and to disallow the passage of the selected second one of the unwanted ions, to thereby generate a second sheet of perforated graphene (612b) in which the apertures have a smaller diameter than the apertures of the first sheet (612a) of perforated graphene. The first (612a) and second (612b) sheets of perforated graphene are juxtaposed, to thereby form a juxtaposed sheet with a first side defined by the first sheet (612a) of perforated graphene, a second side defined by the second sheet (612b) of perforated graphene, and a path (629) for the flow of liquid therebetween. The water carrying unwanted ions is applied to the first side (612a) of the juxtaposed sheet, so that water molecules flow through the juxtaposed sheet (612a) and the path (629) to the second side of the juxtaposed sheet in preference to ions, to thereby produce nominally deionized water. The nominally deionized water molecules are collected from the second side (612b) of the juxtaposed sheet.

A water deionizer comprises a graphene sheet (212) perforated with apertures (312) dimensioned to allow the flow of water molecules and to disallow the flow of ions of a particular type (sodium, for example). A source of water laden with ions of the particular type is provided. A path (210, 226, 227) is provided for the flow of the water laden with ions of the particular type through the graphene sheet perforated with apertures (212). In a particular embodiment of this deionizer, a purge arrangement (220,232) is coupled to the path for the flow, for diverting the flow away from the graphene sheet perforated with apertures (212).

A separator (600) comprises a first graphene sheet perforated with apertures dimensioned to allow the flow of water molecules and to disallow the flow of ions of a first type (612a), and a second graphene sheet perforated with apertures dimensioned to allow the flow of water molecules and to disallow the flow of ions of a second type (612b), where the ions of the second type (Na) are smaller than the ions of the first type (C1). A source (210, 216, 218) is provided of water laden with ions of the first and second types (201). A path (210, 626a) is provided for applying a flow of the water laden with ions of the first and second types (201) to the first graphene sheet perforated with apertures dimensioned to disallow the flow of the ions of the first type (612a). As a result, (a) ions of the first type (C1) accumulate on an upstream side (626a) of the first graphene sheet perforated with apertures dimensioned to disallow the flow of the ions of the first type (626a) and (b) water laden with ions of the second type (Na) flows through the first graphene sheet perforated with apertures dimensioned to disallow the flow of the ions of the first type (626a) to a downstream side (629) of the first graphene sheet perforated with apertures dimensioned to disallow the flow of the ions of the first type (612a). The separator (600) further comprises a path (629) for applying a flow of the water laden with ions of the second type to an upstream side of the graphene sheet perforated with apertures dimensioned to disallow the flow of the ions of the first type (612b). As a result, (a) ions of the second type accumulate on an upstream side (629) of the second graphene sheet perforated with apertures dimensioned to disallow the flow of the ions of the second type (612b) and (b) water free of the ions of the first and second types flows through the second graphene sheet perforated with apertures dimensioned to disallow the flow of the ions of the second type (612b). A collection arrangement (222, 224) is coupled to receive the water free of the ions of the first and second types (202). A further collection arrangement (630a, 632a, 634a; 630b, 632b, 634b) may be provided for separately collecting accumulations of ions.

A method for deionizing fluid carrying unwanted ions, comprises the steps of providing at least one sheet of graphene with plural perforated apertures selected to allow the passage of fluid and to disallow the passage of at least one of the unwanted ions, forming the at least one sheet of graphene into a cylindrical form, inserting the cylindrical form into a housing, pressurizing the fluid carrying unwanted ions to thereby generate pressurized fluid to flow through the housing, applying the pressurized fluid to a first surface of the perforated graphene in the cylindrical form, so that fluid flows to a second side of the at least one perforated graphene sheet in cylindrical form in preference to ions, and collecting the fluid from the second side of the at least one graphene sheet. The method continues wherein at least one ion is chlorine and the apertures for disallowance of the chlorine ions are nominally 0.9 nanometers and the apertures are nominally spaced apart by 15 nanometers. The method further continues wherein at least one ion is sodium, and the apertures for disallowance of the sodium ions is nominally 0.6 nanometers and the apertures are nominally spaced apart by 15 nanometers. The method may also provide a second set of at least one graphene sheet with plural perforated apertures selected to allow the passage of fluid and to disallow the passage of another one or more of the unwanted ions, forming the second set of at least one graphene sheet into a second cylindrical form, inserting the cylindrical form into a second housing, pressurizing the fluid carrying unwanted ions from the housing to thereby generate pressurized fluid to flow through the second housing, and applying the pressurized fluid to a first surface of the second set of said at least one perforated graphene sheet in the second cylindrical form, so that fluid flows to a second side of the second set of said at least one perforated graphene sheet in the second cylindrical form in preference to ions. The method continues wherein the perforated apertures of the at least one sheet of graphene for disallowance of unwanted chlorine ions are nominally 0.9 nanometers, and the perforated apertures of the second set of said at least one graphene sheet for disallowance of unwanted sodium ions are nominally 0.6 nanometers. The method may also provide for the first housing being less selective of ion exclusion than the second housing.

A fluid deionizer comprises a cylindrical form of at least one graphene sheet perforated with apertures dimensioned to allow the flow of fluid and to disallow the flow of ions of at least one particular type, a source of fluid laden with ions of the particular type, and a path for the flow of the fluid laden with ions of the at least one particular type through the cylindrical form of at least one graphene sheet perforated with apertures. The deionizer may further include a second cylindrical form of at least one graphene sheet perforated with apertures dimensioned to allow the flow of fluid and to disallow the flow of ions of another particular type, wherein the second cylindrical form is in the path for the flow of the fluid. The cylindrical forms of at least one graphene sheet are either rolled or spiral-wound. The deionizer further includes a purge valve associated with each cylindrical form and the path for the flow of the fluid to allow concentrated ions disallowed by the cylindrical forms to flow to collecting vessels.

A fluid deionizer also includes at least one graphene sheet perforated with apertures dimensioned to allow a flow of fluid and to disallow at least one particular type of ion contained in the flow of fluid, a support chamber carrying the at least one graphene sheet, the support chamber having an upstream portion that receives the at least one graphene sheet, a source of fluid laden with the at least one particular type of ion, a path for the flow of the fluid laden with the at least one particular type of ion through the at least one graphene sheet perforated with apertures, and a purge valve associated with the upstream portion, the purge valve placed in an open position so as to collect the at least one particular type of ion disallowed by the at least one graphene sheet. The fluid deionizer may include a porous media backing the at least one graphene sheet perforated with apertures. The media is selected from the group consisting of polytetrafluoroethylene, polytetrafluoroethane, polycarbonate, nanostructured carbon or sintered porous metals. The deionizer may provide a second at least one graphene sheet perforated with apertures dimensioned to allow the flow of fluid and to disallow another particular type of ion contained in the flow of fluid, wherein the support chamber carries the second at least one graphene sheet so as to form an intermediate chamber between the at least one graphene sheet and the second at least one graphene sheet, and a downstream chamber underneath the second at least one graphene sheet such that the downstream chamber collects the flow of fluid without the particular types of ions disallowed by the graphene sheets. The fluid deionizer may have a second purge valve, wherein the second purge valve is associated with an intermediate chamber and when placed in an open position collects another particular type of ion disallowed by the second at least one graphene sheet. The deionizer may further include a cross-flow valve associated with the upstream portion, the purge valve and the cross-flow valve opened and closed simultaneously to aid in purging the disallowed type of ion from the support chamber.

A method for separating components from a medium includes the steps of providing a primary sheet of at least one layer of graphene with plural perforated apertures selected to allow the passage of a medium and to disallow the passage of selected components in the medium, providing the primary sheet of at least one layer of graphene in a primary chamber. The primary chamber includes a primary inlet, a primary outlet, and a primary lower flow path. The method continues by pressurizing the medium to flow in a path substantially parallel to the primary sheet of at least one layer of graphene from the primary inlet to the primary outlet, wherein the medium flows on to a first surface of the primary sheet of at least one layer of graphene so that a portion of the medium flows to a second side of the primary sheet of at least one layer of graphene through the plural perforated apertures while a remaining portion of the medium and the disallowed selected components in the medium flow out the primary outlet. The method continues with providing the plural perforated apertures in a range of 0.6 to 1.2 nanometers for purposes of sodium and chlorine deionization. The method may also provide the plural perforated apertures of a size to selectively disallow any selected component selected from the group consisting of ions, particulates, analytes, gases, and hydrocarbons. The method also provides a supporting membrane on a side of the primary sheet of at least one layer of graphene opposite the flow path, the supporting membrane selected from the group consisting of polytetrafluoroethylene, perforated polycarbonate film, and sintered porous metal. The method further yet provides for connecting the primary outlet to a secondary separation apparatus and providing the secondary apparatus with a second sheet of at least one layer of graphene with plural perforated apertures selected to allow the passage of the medium received from the outlet and to disallow the passage of selected components in the medium, providing the second sheet of at least one layer of graphene in a second chamber, the second chamber having a corresponding inlet, outlet, and lower flow path, and pressurizing the medium received from the primary outlet through the secondary inlet to flow in a path substantially parallel to the second sheet of at least one layer of graphene from the secondary inlet to the secondary outlet, the medium flowing on to a first surface of the second sheet of at least one layer of graphene so that a portion of the medium flows to a second side of the second sheet at least one layer of graphene through the plural perforated apertures while a remaining portion of the medium and the disallowed selected components in the medium flow out the secondary outlet.

A separation apparatus comprises at least one chamber having an inlet, an outlet and a lower flow path, at least one sheet of graphene perforated with apertures dimensioned to allow passage of a medium and to disallow passage of selected components in the medium, the at least one sheet of graphene positioned in the at least one chamber, and a pressurized source of the medium connected to the at least one chamber having an inlet, the pressurized source directing the medium along a path substantially parallel to the at least one sheet of graphene from the inlet to the outlet, the medium flowing on to a first surface of the at least one sheet of graphene so that a portion of the medium flows to a second side of the at least one graphene sheet through the plural perforated apertures while a remaining portion of the medium and the disallowed selected components in the medium flow out the outlet. The apparatus may further include the plural perforated apertures sized in a range of 0.6 to 1.2 nanometers. A supporting membrane may be provided on a side of the at least one sheet of graphene opposite the flow path, wherein the supporting membrane is selected from the group consisting of polytetrafluoroethylene, perforated polycarbonate film, and sintered porous metal. The apparatus may include an additional chamber serially connected to the outlet of the at least one chamber, wherein the additional chamber incrementally removes specific components from the medium by utilizing a corresponding at least one graphene sheet that has a smaller aperture diameter than the preceding chamber. The apparatus may also include an additional chamber serially connected to the outlet of the at least one chamber, wherein the additional chamber allows incrementally lower pressure from an additional pressurized source connected to the outlet of the preceding chamber by utilizing a corresponding at least one graphene sheet in the additional chamber that utilizes more selective ion exclusion.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for deionizing fluid carrying unwanted ions, said method comprising:
   providing at least one first sheet of graphene with plural perforated apertures selected to allow the passage of fluid and to disallow the passage of at least one selected one of said unwanted ions;
   forming said at least one first sheet of graphene into a cylindrical form;
   inserting said cylindrical form into a first housing;
   pressurizing said fluid carrying unwanted ions to thereby generate pressurized fluid to flow through said first housing;
   applying said pressurized fluid to a first surface of said at least one first perforated graphene in said cylindrical form, so that fluid flows to a second side of said at least one first perforated graphene sheet in cylindrical form in preference to ions; and
   collecting said fluid from said second side of said at least one first graphene sheet.

2. A method according to claim 1, wherein said at least one ion is chlorine, and said apertures for disallowance of said chlorine ions are nominally 0.9 nanometers.

3. A method according to claim 2, wherein said apertures are nominally spaced apart by 15 nanometers.

4. A method according to claim 1, wherein said selected at least one ion is sodium, and said apertures for disallowance of said sodium ions is nominally 0.6 nanometers.

5. A method according to claim 4, wherein said apertures are nominally spaced apart by 15 nanometers.

6. A method according to claim 1, further comprising:
   providing a first set of graphene sheets with plural perforated apertures selected to allow the passage of fluid and to disallow the passage of at least one selected one of said unwanted ions;
   forming said first set of graphene sheets into a first cylindrical form;
   inserting said first cylindrical form into a first housing;
   providing a second set of graphene sheets with plural perforated apertures selected to allow the passage of fluid and to disallow the passage of another one or more of said unwanted ions;
   forming said second set of graphene sheets into a second cylindrical form;
   inserting said second cylindrical form into a second housing;
   pressurizing said fluid carrying unwanted ions from said first housing to thereby generate pressurized fluid to flow through said second housing; and
   applying said pressurized fluid to a first surface of said second set of graphene sheets in said second cylindrical form, so that fluid flows to a second side of said second set of said at least one perforated graphene sheet in said second cylindrical form in preference to ions.

7. A method according to claim 6, wherein said perforated apertures of said first set of graphene sheets are for disallowance of unwanted chlorine ions and are nominally 0.9 nanometers, and said perforated apertures of said second set of graphene sheets are for disallowance of unwanted sodium ions and are nominally 0.6 nanometers.

8. A method according to claim 6, wherein said first housing is less selective of ion exclusion than said second housing.

9. A fluid deionizer, comprising:
   a first cylindrical form of at least one graphene sheet perforated with apertures dimensioned to allow the flow of fluid and to disallow the flow of ions of at least one particular type;
   a source of fluid laden with ions of said at least one particular type; and
   a path for the flow of the fluid laden with ions of said at least one particular type through said cylindrical form of at least one graphene sheet perforated with apertures.

10. The deionizer according to claim 9, further comprising:
    a second cylindrical form of at least one graphene sheet perforated with apertures dimensioned to allow the flow of fluid and to disallow the flow of ions of at least another particular type; wherein said second cylindrical form is in said path for the flow of said fluid, wherein said source of fluid is laden with ions of said at least one particular type and of said at least another particular type.

11. The deionizer according to claim 10, wherein said first and second cylindrical forms of at least one graphene sheet are rolled.

12. The deionizer according to claim 10, wherein said first and second cylindrical forms of at least one graphene sheet are spiral-wound.

13. The deionizer according to claim 10, further comprising:
    a purge valve associated with each said cylindrical form and said path for the flow of the fluid to allow concentrated ions disallowed by each said cylindrical form to flow to collecting vessels.

14. A fluid deionizer comprising:
    at least one first graphene sheet perforated with apertures dimensioned to allow a flow of fluid and to disallow at least one particular type of ion contained in the flow of fluid;
    a support chamber carrying said at least one first graphene sheet, said support chamber having an upstream portion that receives said at least one first graphene sheet;
    a source of fluid laden with said at least one particular type of ion;
    a path for the flow of the fluid laden with said at least one particular type of ion through said at least one first graphene sheet perforated with apertures; and
    a purge valve associated with said upstream portion, said purge valve placed in an open position so as to collect said at least one particular type of ion disallowed by said at least one first graphene sheet.

15. A fluid deionizer according to claim 14, further comprising:
    a porous media backing said at least one first graphene sheet perforated with apertures.

16. A fluid deionizer according to claim 15, wherein said porous media is selected from the group consisting of polytetrafluoroethylene, polytetrafluoroethane, polycarbonate, nanostructured carbon and sintered porous metals.

17. A fluid deionizer according to claim 16, further comprising:
a second purge valve, said second purge valve associated with an intermediate chamber and when placed in an open position collects said another particular type of ion disallowed by said at least one second graphene sheet.

18. A fluid deionizer according to claim 14, further comprising:
at least one second graphene sheet perforated with apertures dimensioned to allow the flow of fluid and to disallow another particular type of ion contained in the flow of fluid;
said support chamber carrying said at least one second graphene sheet so as to form an intermediate chamber between said at least one first graphene sheet and said at least one second graphene sheet, and a downstream chamber underneath said at least one second graphene sheet; and
said downstream chamber collecting the flow of fluid without said particular types of ions disallowed by said graphene sheets.

19. A fluid deionizer according to claim 14, further comprising:
a cross-flow valve associated with said upstream portion, said purge valve and said cross-flow valve opened and closed simultaneously to aid in purging said disallowed type of ion from said support chamber.

20. A method for separating components from a medium, comprising:
providing a primary sheet of at least one layer of graphene with plural perforated apertures selected to allow the passage of a medium and to disallow the passage of selected components in the medium;
providing said primary sheet of at least one layer of graphene in a primary chamber, said primary chamber having a primary inlet, a primary outlet, and a primary lower flow path; and
pressurizing the medium to flow in a path substantially parallel to said primary sheet of at least one layer of graphene from said primary inlet to said primary outlet, the medium flowing on to a first surface of said primary sheet of at least one layer of graphene so that a portion of the medium flows to a second side of said primary sheet of at least one layer of graphene through said plural perforated apertures while a remaining portion of the medium and the disallowed selected components in the medium flow out said primary outlet.

21. The method according to claim 20, further comprising:
providing said plural perforated apertures in a range of 0.6 to 1.2 nanometers for purposes of sodium and chlorine deionization.

22. The method according to claim 20, further comprising:
providing said plural perforated apertures of a size to selectively disallow any selected component selected from the group consisting of ions, particulates, analytes, gases, and hydrocarbons.

23. The method according to claim 20, further comprising:
providing a supporting membrane on a side of said primary sheet of at least one layer of graphene opposite said flow path, said supporting membrane selected from the group consisting of polytetrafluoroethylene, perforated polycarbonate film, and sintered porous metal.

24. The method according to claim 20, further comprising:
connecting said primary outlet to a secondary separation apparatus.

25. The method according to claim 24, further comprising:
providing said secondary apparatus with a second sheet of at least one layer of graphene with plural perforated apertures selected to allow the passage of the medium received from said outlet and to disallow the passage of selected components in the medium;
providing said second sheet of at least one layer of graphene in a second chamber, said second chamber having a corresponding inlet, outlet, and lower flow path; and
pressurizing the medium received from said primary outlet through said secondary inlet to flow in a path substantially parallel to said second sheet of at least one layer of graphene from said secondary inlet to said secondary outlet, the medium flowing on to a first surface of said second sheet of at least one layer of graphene so that a portion of the medium flows to a second side of said second sheet of at least one layer of graphene through said plural perforated apertures while a remaining portion of the medium and the disallowed selected components in the medium flow out said secondary outlet.

26. A separation apparatus, comprising:
at least one chamber having an inlet, an outlet and a lower flow path;
at least one sheet of graphene perforated with apertures dimensioned to allow passage of a medium and to disallow passage of selected components in the medium, said at least one sheet of graphene positioned in said at least one chamber; and
a pressurized source of said medium connected to said at least one chamber having said inlet, said pressurized source directing said medium along a path substantially parallel to said at least one sheet of graphene from said inlet to said outlet, the medium flowing on to a first surface of said at least one sheet of graphene so that a portion of the medium flows to a second side of said at least one graphene sheet through said plural perforated apertures while a remaining portion of the medium and the disallowed selected components in the medium flow out said outlet.

27. The apparatus according to claim 26, wherein said plural perforated apertures are sized in a range of 0.6 to 1.2 nanometers.

28. The apparatus according to claim 27, further comprising:
a supporting membrane on a side of said at least one sheet of graphene opposite said flow path, said supporting membrane selected from the group consisting of polytetrafluoroethylene, perforated polycarbonate film, and sintered porous metal.

29. The apparatus according to claim 26, further comprising:
an additional said chamber serially connected to said outlet of said at least one chamber, wherein said additional chamber incrementally removes specific components from said medium by utilizing a corresponding at least one graphene sheet that has a smaller aperture diameter than said at least one chamber.

30. The apparatus according to claim 26, further comprising:
- an additional said chamber serially connected to said outlet of said at least one chamber, wherein said additional chamber allows incrementally lower pressure from an additional pressurized source connected to said outlet of said at least one chamber by utilizing a corresponding at least one graphene sheet in said additional chamber that utilizes more selective ion exclusion.

* * * * *